United States Patent [19]

Galasso et al.

[11] Patent Number: 5,204,317

[45] Date of Patent: Apr. 20, 1993

[54] PROCESS FOR MAKING HIGH CRITICAL CURRENT DENSITY $Bi_2CaSr_2Cu_2O_8$ SUPERCONDUCTOR

[75] Inventors: Francis S. Galasso, Manchester; David A. Condit, Avon, both of Conn.

[73] Assignee: United Technologies Corporation, Hartford, Conn.

[21] Appl. No.: 737,296

[22] Filed: Jul. 29, 1991

[51] Int. Cl.$^5$ .................. C01F 11/02; C01G 3/02; C01G 29/00

[52] U.S. Cl. .................. 505/1; 505/742; 505/782

[58] Field of Search .................. 505/1, 782, 742

[56] References Cited

PUBLICATIONS

Takayama –"Identification of the Superconducting Phase in ... ", Jap. Jnl. Appl. Phys. v.27(3) Mar. 1988, pp. L265–L368.

Urland, "Dependence of $T_c$ on Hole Concentration in $Bi_2Sr_{3-x}Ca_xCu_2O_{8+\delta}$ Superconductors", Solid State Conn. v.69(10) 1989, pp. 995–997.

Tarascon, "Crystal Substructure & Physical Properties ... ", Phys. Rev. B, 1988.

Onoda, "Assignment of the Powder X-Ray Diffraction Pattern ... ", Jap. Jnl. Appl. Phys. v.27(5) May 1988, pp. L833–L836.

Wang, "Production and Characterization of Single Crystal . . .", Solid State Comm. v.68(8), 1989, pp. 829–832.

Furcone, "Spin-on $Bi_4Sr_3Ca_3Cu_4O_{16+x}$ Superconducting ... ", Appl. Phys. Lett. v.52(25) Jun. 20, 1988, pp. 2680–2682.

Ishida, "Critical Temperature Enhancement of $Bi_2Sr_2CaCu_2O_x$... ", Appl. Phys. Lett. v.55(14) Oct. 2, 1989, pp. 1457–1459.

Primary Examiner—Paul Lieberman
Assistant Examiner—John Boyd
Attorney, Agent, or Firm—George J. Romanik

[57] ABSTRACT

A method for making a high critical current density $Bi_2CaSr_2Cu_2O_8$ superconductor includes mixing suitable solid state reactants in amounts sufficient to create a reactant mixture having a ratio of approximately 4 Bi atoms:3 Ca atoms:3 Sr atoms:4 Cu atoms and oxygen. The reactant mixture is heated to a sufficient temperature for a sufficient time to sinter the reactant mixture and form a $Bi_2CaSr_2Cu_2O_8$ superconductor.

5 Claims, 1 Drawing Sheet

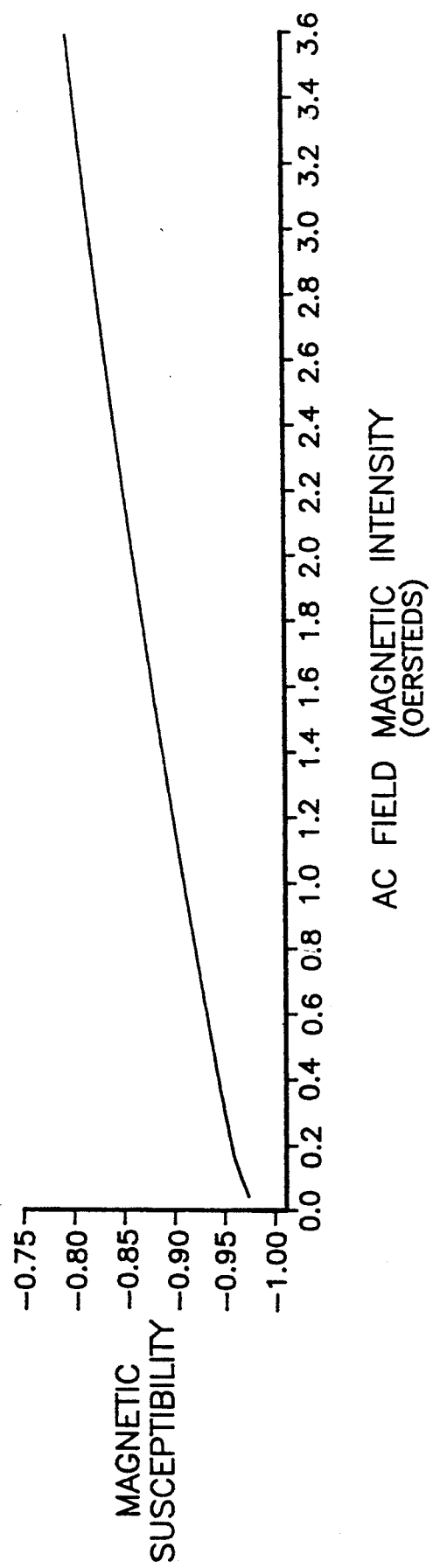

PROCESS FOR MAKING HIGH CRITICAL CURRENT DENSITY BI$_2$CASR$_2$CU$_2$O$_8$ SUPERCONDUCTOR

TECHNICAL FIELD

The present invention is directed towards a Bi$_2$CaSr$_2$Cu$_2$O$_8$ superconductor having a high critical current density.

BACKGROUND ART

Since the discovery of high critical temperature ($T_c$) superconductors in the mid-1980s, efforts have been made to identify new high $T_c$ superconducting materials and new methods of making such materials. The term high $T_c$ superconductors, as used in this application, refers to superconductors with $T_c$s greater than 77K, the boiling point of nitrogen. Among the known high $T_c$ superconductors are the so-called 1-2-3 materials, including YBa$_2$Cu$_3$O$_{7-\delta}$ and similar materials. Other known high $T_c$ superconductors include a Bi-Ca-Sr-Cu-O family of materials.

High $T_c$ superconductors are commonly made by a solid state reaction. Conventional reactants include oxides of the superconductors' constituent elements and other compounds, such as nitrates, citrates, and carbonates, that decompose into oxides when heated. The reactants are mixed in stoichiometric quantities to form a reactant mixture, pressed to consolidate the mixture, and heated to convert the mixture into a superconductor. Depending on the composition of the reactant mixture, a multiphase, that is, a multicomponent, product rather than a single phase product may be formed. For example, a reactant mixture of 1 mole Bi$_2$O$_3$, 1 mole CaCO$_3$, 2 moles SrCO$_3$, and 2 moles CuO has been found to form a multiphase product rather than a single phase Bi$_2$CaSr$_2$Cu$_2$O$_8$ product as expected from the stoichiometry. The presence of more than one phase in the product may have a detrimental effect on the product's properties.

One particularly important property that may be affected by the presence of more than one phase in the superconducting product is the critical current density ($J_c$), a measure of a material's ability to carry an electrical current. A higher critical current density means that a material is able to carry a higher current than a material with a lower critical current density. Superconductors having a high critical current density are desirable for use in many of the devices that can benefit from the use of superconductors, such as motors, generators, and magnets. Because of the presence of multiple phases and other factors, such as crystallite orientation, however, many high $T_c$ superconductors have low critical current densities. As a result, the benefits to be derived from using high $T_c$ superconductors in many practical applications may be difficult to achieve.

Accordingly, what is needed in the industry are methods for making high $T_c$ superconductors having high critical current densities.

DISCLOSURE OF THE INVENTION

The present invention is directed towards a method for making a high $T_c$ superconductor having a high critical current density.

One aspect of the invention includes a method for making a high critical current density Bi$_2$CaSr$_2$Cu$_2$O$_8$ superconductor in which suitable solid state reactants are mixed in amounts sufficient to create a reactant mixture having a ratio of approximately 4 Bi atoms:3 Ca atoms:3 Sr atoms:4 Cu atoms and oxygen. The reactant mixture is heated to a sufficient temperature for a sufficient time to sinter the reactant mixture and form a Bi$_2$CaSr$_2$Cu$_2$O$_8$ superconductor.

Another aspect of the invention includes a high critical current density Bi$_2$CaSr$_2$Cu$_2$O$_8$ superconductor made by the above method.

The foregoing and other features and advantages of the present invention will become more apparent from the following description and accompanying drawing.

BRIEF DESCRIPTION OF THE DRAWING

The Figure is a graph that shows the magnetic susceptibility of a superconductor of the present invention as a function of the magnetic intensity of an alternating current field.

BEST MODE FOR CARRYING OUT THE INVENTION

The method of the present invention uses a high temperature reaction between a mixture of Bi, Ca, Sr, and Cu solid state reactants and oxygen to form a Bi$_2$CaSr$_2$Cu$_2$O$_8$ superconductor. The reactants may be Bi, Ca, Sr, and Cu oxides or salts that decompose into oxides when heated. Mixtures of oxides and salts are acceptable. Suitable salts include nitrates, citrates, and carbonates. Salts are often used when they can be obtained in higher purities than the respective oxides. If desired, the salts may be decomposed to oxides in a preliminary step so all of the reactants are oxides. Several methods are available to decompose the salts to oxides. For example, the salts may be mixed in a selected ratio and thermally decomposed to form an oxide powder mixture. Alternately, the salts may be dissolved in a hot, concentrated acid solution, such as HNO$_3$, to form an aqueous solution. Water may be evaporated from the solution to produce a dry residue and the dry residue may be heated to about 200° C. to drive off volatiles. The devolatilized residue may be ground to form a fine powder mixture.

To make the Bi$_2$CaSr$_2$Cu$_2$O$_8$ superconductor of the present invention, the reactants should be mixed in amounts sufficient to create a reactant mixture having a ratio of approximately 4 Bi atoms:3 Ca atoms:3 Sr atoms:4 Cu atoms. This mixture resembles a stoichiometric mixture for making Bi$_4$Ca$_3$Sr$_3$Cu$_4$O$_x$. For example, 2 moles of Bi$_2$O$_3$ may be mixed with 3 moles of CaCO$_3$, 3 moles of SrCO$_3$, and 4 moles of CuO to form a reactant mixture. Although the atomic ratio of Bi:Ca:Sr:Cu in the reactant mixture should be as close to 4:3:3:4 as possible, the proportion of each element in the mixture may vary by about 10% from its target.

After the reactants are mixed, they should be loosely compacted in the bottom of a boat or comparable working vessel. The loosely compacted reactant mixture should be sufficiently porous to permit oxygen to infiltrate to the interior of the mixture. The boat may be alumina, platinum, or some other nonreactive material.

The reactant mixture should be heated to a sufficient temperature for a sufficient time to permit it to sinter and be converted to the desired Bi$_2$CaSr$_2$Cu$_2$O$_8$ superconductor. For example, the reactant mixture may be heated to between about 840° C. and about 870° C. and held within that temperature range for at least about 2 days. The preferred temperature range is about 850° C. to about 856° C. Preferably, the reactant mixture will be held at a suitable temperature for at least about 3 days. The heating step should be done in an oxygen-containing atmosphere, such as air or oxygen, to provide the oxygen necessary for the reaction. Because the reaction mixture sinters as it reacts to form $Bi_2CaSr_2Cu_2O_8$, the $Bi_2CaSr_2Cu_2O_8$ is more dense that the original reaction mixture. Reactants in excess of the stoichiometric amounts needed to make $Bi_2CaSr_2Cu_2O_8$ are thought to be absorbed by the boat or driven off by the high temperature.

The following example is given to demonstrate the present invention without limiting the invention's broad scope.

EXAMPLE 14.028 g (0.030 moles) of $Bi_2O_3$, 4.518 g (0.045 moles) of $CaCO_3$, 6.660 g (0.045 moles) of $SrCO_3$, and 4.788 g (0.060 moles) of CuO were mixed and loosely compacted in the bottom of an alumina boat. The loosely compacted reactant mixture was porous enough to permit oxygen to flow to the material in the interior of the mixture. The boat was placed in a hot furnace near a thermocouple that read 856° C. and left for three days. During that time, the temperature at the thermocouple was held between 850° C. and 856° C. After three days, the boat and its contents were cooled slowly and removed from the furnace. X-ray reflection analysis of the material in the boat showed that it was a single phase of $Bi_2CaSr_2Cu_2O_8$.

The superconductivity of the $Bi_2CaSr_2Cu_2O_8$ made in the Example was indirectly tested by measuring the strength of its Meissner effect. The Meissner effect is the ability of a superconductor to exclude a magnetic field from its interior. A material having a stronger Meissner effect at a particular temperature is normally a better superconductor than a material having a weaker Meissner effect. Three samples of $Bi_2CaSr_2Cu_2O_8$. one made in the Example and two made by a conventional method, were cooled in liquid $N_2$ and placed under a magnet attached to a strain gauge All three samples displayed a Meissner effect by displacing the magnet. The force with which the magnet was displaced, as read on the strain gauge, was the measure of the strength of the Meissner effect. The Table shows Meissner effect data for the three $Bi_2CaSr_2Cu_2O_8$ samples.

TABLE

| Sample | Force on Magnet dynes/min |
| --- | --- |
| 1 | 4600 |
| 2 | 1400 |
| 3 | 2200 |

Sample 1 was the $Bi_2CaSr_2Cu_2O_8$ made using the present invention. Samples 2 and 3 were made from a reactant mixture having a ratio of 2 Bi atoms:1 Ca atom:2 Sr atoms:2 Cu atoms, the conventional proportion used to make a $Bi_2CaSr_2Cu_2O_8$ material. The data show that the material made by the present invention is a better superconductor than material made in the conventional way because of its stronger Meissner effect.

The critical current density of the $Bi_2CaSr_2Cu_2O_8$ made in the Example was indirectly tested by measuring the material's magnetic susceptibility. The magnetic susceptibility measures a material's response to an applied magnetic field. A sample of the $Bi_2CaSr_2Cu_2O_8$ made in the Example was subjected to an alternating current (ac) field at several temperatures and direct current (dc) field strengths. The Figure shows the magnetic susceptibility of the sample at 40K and a dc field strength of 0 as a function of the magnetic intensity of the ac field. The flat curve indicates a low ac field penetration, which in turn indicates a high critical current density. Based on this test, the $Bi_2CaSr_2Cu_2O_8$ of the present invention was judged to have a high critical current density.

The high critical current density found in the superconductor of the present invention is thought to be related to the growth of oriented crystallites caused by the stable temperature and long duration of the manufacturing step. The oriented crystallites provide pathways to support a large flow of current through the superconductor.

It should be understood that the invention is not limited to the particular embodiments shown and described herein, but that various changes and modifications may be made without departing from the spirit or scope of the claimed invention.

We claim:

1. A method for making a high critical current density $Bi_2CaSr_2Cu_2O_8$ high $T_c$ superconductor, consisting essentially of sequentially:
   (a) mixing suitable solid state reactants in amounts sufficient to create a reactant mixture having a ratio of approximately 4 Bi atoms:3 Ca atoms:3 Sr atoms:4 Cu atoms and oxygen;
   (b) loosely compacting the reactant mixture so the reactant mixture is sufficiently porous to permit oxygen to infiltrate to the interior of the reaction mixture;
   (c) heating the reactant mixture to a temperature between about 840° C. and about 870° C. in an oxygen-containing atmosphere; and
   (d) maintaining the reactant mixture at a temperature between about 840° C. and about 870° C. for at least about 2 days in the oxygen-containing atmosphere to sinter the reactant mixture and form a $Bi_2CaSr_2Cu_2O_8$ superconductor;
   wherein the superconductor has a high critical current density.

2. The method of claim 1 wherein the reactants are selected from the group consisting of Bi oxide, Ca oxide, Sr oxide, Cu oxide, Bi salts, Ca salts, Sr salts, and Cu salts, wherein the Bi salts, Ca salts, Sr salts, and Cu salts are capable of decomposing into Bi oxide, Ca oxide, Sr oxide, and Cu oxide, respectively, upon heating.

3. The method of claim 1 wherein the reactant mixture is heated to a temperature between about 850° C. and about 856° C. and maintained at a temperature between about 850° and about 856° C. for at least about 2 days.

4. The method of claim 1 wherein the reactant mixture is maintained at a temperature between about 840° C. and about 870° C. for at least about 3 days.

5. The method of claim 1 wherein the reactant mixture is heated to a temperature between about 850° C. and about 856° C. and maintained at a temperature between about 850° C. and about 856° C. for at least about 3 days.

* * * * *